(12) United States Patent
Berg et al.

(10) Patent No.: US 9,434,258 B2
(45) Date of Patent: Sep. 6, 2016

(54) POWER CONVERTER WITH DIAGNOSTIC UNIT POWER SUPPLY OUTPUT

(71) Applicant: GM Global Technology Operations LLC, Detroit, MI (US)

(72) Inventors: Joseph Berg, Indianapolis, IN (US); John W. Meyer, III, Fishers, IN (US); Wesley O. Hamilton, Indianapolis, IN (US); Robert S. Foley, Rochester, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 895 days.

(21) Appl. No.: 13/653,003

(22) Filed: Oct. 16, 2012

(65) Prior Publication Data

US 2013/0127243 A1 May 23, 2013

Related U.S. Application Data

(60) Provisional application No. 61/561,466, filed on Nov. 18, 2011.

(51) Int. Cl.
| | |
|---|---|
| *B60R 16/03* | (2006.01) |
| *B60L 3/00* | (2006.01) |
| *B60L 3/04* | (2006.01) |
| *B60L 7/14* | (2006.01) |
| *B60L 11/18* | (2006.01) |

(52) U.S. Cl.
CPC .............. *B60L 3/0053* (2013.01); *B60L 3/04* (2013.01); *B60L 7/14* (2013.01); *B60L 11/1803* (2013.01); *B60L 11/1868* (2013.01); *B60L 11/1885* (2013.01); *B60L 11/1887* (2013.01); *B60L 2210/12* (2013.01); *Y02T 10/7066* (2013.01); *Y02T 10/7233* (2013.01); *Y02T 90/34* (2013.01)

(58) Field of Classification Search
None
See application file for complete search history.

(56) References Cited

U.S. PATENT DOCUMENTS

| | | | | |
|---|---|---|---|---|
| 4,241,250 | A | * | 12/1980 | Steigerwald ................ 219/620 |
| 4,803,472 | A | | 2/1989 | Murari et al. |
| 5,373,195 | A | | 12/1994 | De Doncker et al. |
| 5,666,029 | A | * | 9/1997 | McDonald .................... 315/86 |
| 5,796,175 | A | | 8/1998 | Itoh et al. |
| 5,991,182 | A | | 11/1999 | Novac et al. |
| 6,239,582 | B1 | | 5/2001 | Buzan et al. |

(Continued)

FOREIGN PATENT DOCUMENTS

CN 101540560 A 9/2009

OTHER PUBLICATIONS

Chinese Office Action for Chinese Patent Application for Invention No. 201210558534.7, Mailed on Aug. 5, 2014, 7 pages.

(Continued)

*Primary Examiner* — Rexford Barnie
*Assistant Examiner* — Terrence Willoughby
(74) *Attorney, Agent, or Firm* — Cantor Colburn LLP

(57) ABSTRACT

A power converter includes positive and negative input lines and an input capacitor coupled across the input lines. The power converter also includes a switch coupled across the input lines that includes a control contact and an additional contact. The power converter also includes switch controller coupled to the control contact and that includes positive and negative input connections. The power converter also includes a contactor diagnostic supply interface coupled between the positive input connection and the additional contact.

18 Claims, 4 Drawing Sheets

(56) References Cited

U.S. PATENT DOCUMENTS

| | | |
|---|---|---|
| 6,271,712 B1 | 8/2001 | Ball |
| 6,275,093 B1 | 8/2001 | Shekhawat et al. |
| 6,747,880 B2 | 6/2004 | Grover |
| 6,978,854 B1 | 12/2005 | Kuang et al. |
| 7,015,561 B2 | 3/2006 | Saxelby et al. |
| 7,084,609 B2 | 8/2006 | Pillote et al. |
| 7,116,080 B2 | 10/2006 | Chen |
| 7,199,636 B2 | 4/2007 | Oswald et al. |
| 7,227,340 B2 | 6/2007 | Chen |
| 7,271,570 B2 | 9/2007 | O'Gorman et al. |
| 7,292,445 B2 | 11/2007 | Linke |
| 7,436,080 B2 | 10/2008 | Hackl et al. |
| 7,961,449 B2 | 6/2011 | Kaster et al. |
| 8,020,650 B2 | 9/2011 | Van Maanen et al. |
| 8,064,227 B2 | 11/2011 | Namuduri et al. |
| 8,140,205 B2 | 3/2012 | Hanyu et al. |
| 8,170,744 B2 * | 5/2012 | Nagasawa et al. ............ 701/36 |
| 8,314,578 B2 | 11/2012 | Namuduri et al. |
| 8,606,447 B2 | 12/2013 | Namuduri et al. |
| 8,779,706 B2 * | 7/2014 | Tsuji ...................... 318/400.21 |
| 2004/0053082 A1 * | 3/2004 | McCluskey et al. ............. 429/9 |
| 2008/0284385 A1 | 11/2008 | Namuduri et al. |
| 2010/0060245 A1 | 3/2010 | Namuduri et al. |
| 2010/0225258 A1 | 9/2010 | Namuduri et al. |
| 2010/0236851 A1 | 9/2010 | Van Maanen et al. |
| 2010/0250194 A1 * | 9/2010 | Newhouse ............ B60R 16/023 702/183 |
| 2011/0050174 A1 | 3/2011 | King et al. |
| 2011/0101774 A1 | 5/2011 | Wagner |
| 2011/0144842 A1 | 6/2011 | Ni et al. |

OTHER PUBLICATIONS

Finco, S., et al. "High Performance NMOS Active Zener and Rectifier Diodes". IEEE 2001. pp. 658-663.

* cited by examiner

POWER CONVERTER WITH DIAGNOSTIC UNIT POWER SUPPLY OUTPUT

CROSS-REFERENCES TO RELATED APPLICATIONS

This application claims priority to U.S. Provisional Patent Application Ser. No. 61/561,466, filed Nov. 18, 2011, entitled POWER CONVERTER WITH DIAGNOSTIC UNIT POWER SUPPLY OUTPUT, and which is incorporated by reference herein it is entirety.

FIELD OF THE INVENTION

Exemplary embodiments of the invention relate to power converters and, in particular, to a power converter for use in an electric vehicle.

BACKGROUND

Vehicle manufacturers produce vehicles used for transportation in many different configurations using various different types of propulsion systems (e.g., engines or other powerplants). Most consume gasoline or diesel fuel. More recently, manufacturers have increased production of vehicles having propulsion systems that utilize alternative fuels. These vehicles are sometimes referred to as alternative fuel vehicles.

One example of such a vehicle is a hybrid-electric vehicle, or simply, hybrid, that combines an internal combustion engine (ICE) and an electric motor to provide propulsion for the vehicle. In such a case, the ICE burns gasoline or diesel fuel and batteries are used to drive the electric motor.

Another example is a fully electric vehicle. In some cases, a fully electric vehicle does not include an ICE and can include, for example, a fuel cell as the primary source of electric power provided to the electric motor. Such systems can also include batteries that can drive the motor. In particular, the batteries provide instantaneous power needed when the vehicle is accelerated and before/while the fuel cell ramps up its output to meet the demand of the acceleration.

SUMMARY OF THE INVENTION

In one embodiment, a power converter for use in a vehicle that includes a fuel cell and an electric motor is disclosed. The power converter of this embodiment includes input lines including a positive input line and a negative input line and an input capacitor coupled across the input lines. The power converter of this embodiment also includes a switch coupled across the input lines that includes a control contact and an additional contact. The power converter of this embodiment also includes switch controller coupled to the control contact and that includes positive and negative input connections. The power converter of this embodiment also includes a contactor diagnostic supply interface coupled between the positive input connection and the additional contact.

In another embodiment, a vehicle that includes a fuel cell, an electric motor and a power converter electrically coupled between the fuel cell and the electric motor is disclosed. In this embodiment, the power converter includes input lines including a positive input line and a negative input line and an input capacitor coupled across the input lines. The power converter in this embodiment also includes a switch coupled across the input lines that includes a control contact and an additional contact. The power converter in this embodiment also includes switch controller coupled to the control contact and that includes positive and negative input connections. The power converter in this embodiment also includes a contactor diagnostic supply interface coupled between the positive input connection and the additional contact.

In another embodiment, a method of performing a diagnostic test on a fuel cell in a vehicle that includes a power converter electrically coupled between the fuel cell and an electric motor is disclosed. The method of this embodiment includes: charging an input capacitor of the power converter with a power supply that is electrically isolated from the fuel cell; and utilizing the charge in the input capacitor to perform the diagnostic test.

The above features and advantages, and other features and advantages of the invention are readily apparent from the following detailed description when taken in connection with the accompanying drawings.

BRIEF DESCRIPTION OF THE DRAWINGS

Other features, advantages and details appear, by way of example only, in the following detailed description of the embodiments, the detailed description referring to the drawings in which.

DESCRIPTION OF THE EMBODIMENTS

Figure 1:
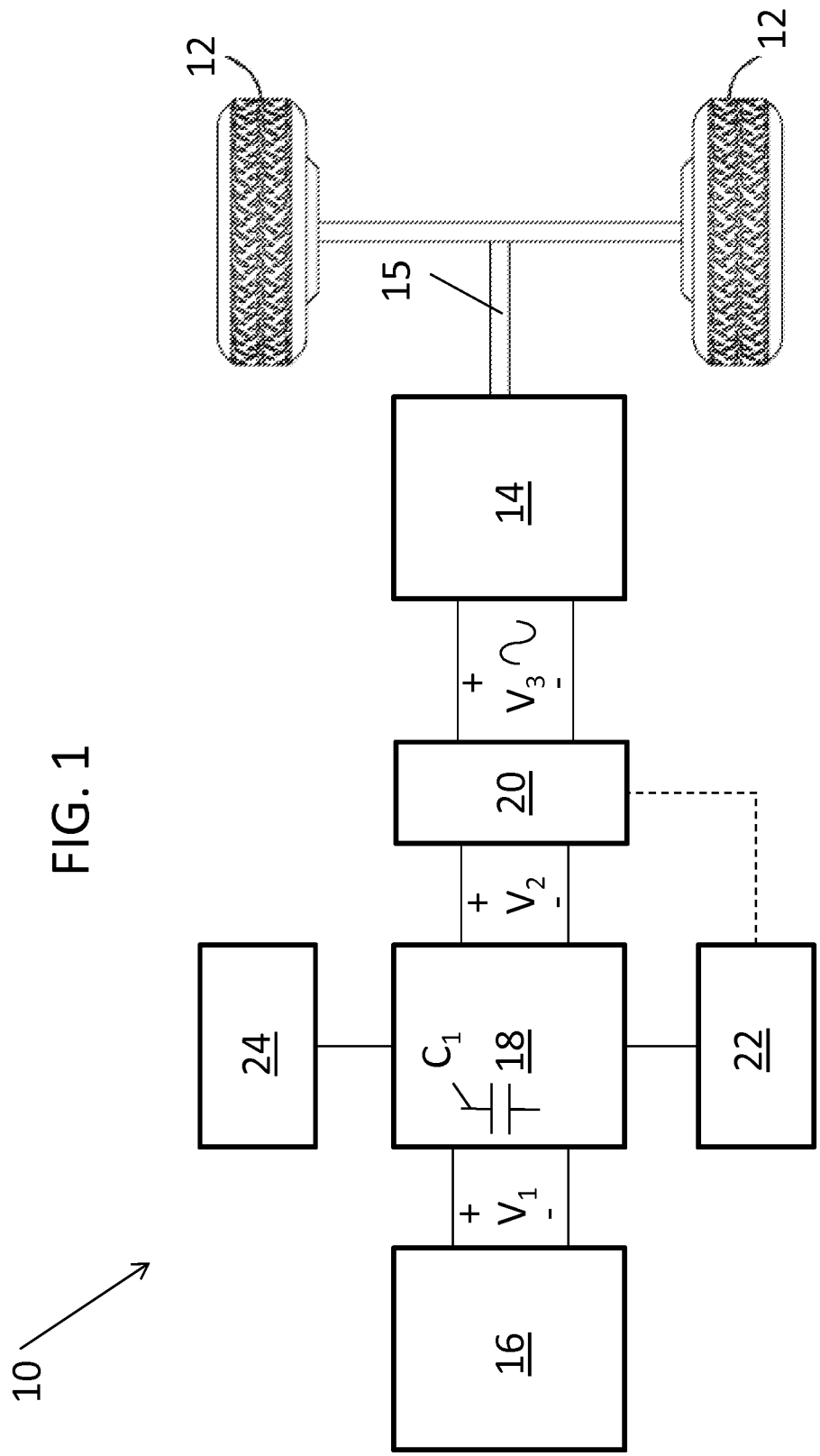
FIG. 1 is a simplified schematic of a vehicle.

The following description is merely exemplary in nature and is not intended to limit the present disclosure, its application or uses. It should be understood that throughout the drawings, corresponding reference numerals indicate like or corresponding parts and features.

As discussed above, fully electric vehicles can include a fuel cell and batteries, both of which provide power to an electric motor. When the vehicle is turned off, contactors open and electrically disconnect the fuel cell from the rest of the vehicle. In some cases, however, the contactor could become stuck in a closed position and fail to open. There are several reasons the contactors can become stuck in the closed position. For instance, a solenoid that causes the contactor to open could fail or the contactor, due to arcing, could become welded closed. In addition, in some cases the contactor could become stuck open.

At present, some electric vehicles may require that the contactors be operating correctly before the fuel cell is activated and the electric vehicle may be started. This can help ensure that when the vehicle is turned off, the fuel cell can again be disconnected from the rest of the vehicle. Such vehicles may include a testing circuit/logic that performs a self-test to determine whether the contactors have become stuck or are otherwise operating incorrectly. In order to properly perform such tests, in one embodiment, power is back fed from a power converter to the contactors. This is in contrast to operation of current electric vehicles where power only flows from the fuel cell to the power converter.

FIG. 1 is a simplified schematic of a vehicle 10. In one embodiment, the vehicle 10 is a fully electric vehicle but could include an ICE in another embodiment. The illustrated vehicle 10 includes wheels 12 that are driven by an electric motor 14. As illustrated, the wheels 12 are coupled to the electric motor 14 via a transmission system illustrated by reference numeral 15.

The electric motor 14 is an alternating current (AC) motor in one embodiment. It shall be understood that the electric motor 14 could be any suitable type of electric motor as is now known or later developed. In the following discussion the electric motor 14 will be assumed to be an AC motor.

The illustrated vehicle 10 includes a fuel cell 16 and high voltage (HV) batteries 22. The fuel cell 16 is the primary source of electric power provided to the electric motor 14. The operation of a fuel cell is generally known and generally includes harnessing energy from electrochemical reactions between hydrogen and oxygen.

It is typically necessary to interface the fuel cell 16 to the high voltage propulsion bus with a power converter 18 to enable proper power sharing between the fuel cell 18 and the HV batteries 22. In particular, the fuel cell 16 provides a voltage, $V_1$, to the power converter 18 that is then raised by power converter 18 to a higher voltage, $V_2$. Both $V_1$ and $V_2$ are DC voltages in one embodiment. Of course, the actual values of $V_1$ and $V_2$ can be varied depending on the application. In the following description the power converter 18 is illustrated as a power converter. It shall be understood, however, that the power converter could be implemented as a buck converter or other suitable converter.

As is known in the art, the power converter 18 may include a controller (not shown) that receives power from an isolated power source (represented in FIG. 3 as 82) to drive a switch (e.g. an insulated gate bipolar transistor (IGBT)) used in converting $V_1$ to $V_2$. Accordingly, the vehicle illustrated in FIG. 1 also includes a power source 24 coupled to power converter 18. In one embodiment, the power source 24 is a standard 12V car battery included in a conventional ICE and, as explained below, is isolated from one or both the fuel cell 16 and the HV batteries 22. The power source 24 can serve several functions in the vehicle 10 but for purposes herein it shall be assumed that it functions as least to provide power for the components that drive the switch in the power converter 18.

The vehicle 10 also includes an inverter 20 that forms a uni- or polyphase AC output ($V_3$) from $V_2$. $V_3$ is provided to electric motor 14. During, for example, acceleration, the fuel cell 16 may not provide power rapidly enough to cause the desired acceleration. As such, the vehicle 10 also includes one or more high voltage batteries (collectively referred to by reference numeral 22) coupled to the power converter 18. The batteries 22 may also, as is known in the art, provide a repository for power produced during braking (regenerative braking) of the electric motor 14.

As described above, in prior applications, power only flowed from the fuel cell 16 to the power converter 18 and not in the other direction. According to one embodiment, during startup (i.e., before power begins to flow from the fuel cell 16 to the power converter 18) power is back fed from the power converter 18 to the fuel cell 16 to be used during one or more contactor diagnostic tests. In more detail, and as shown below, during start up, an input capacitor $C_1$ of the power converter 18 is charged and provides a source of power used in contactor diagnostic tests.

Figure 2:
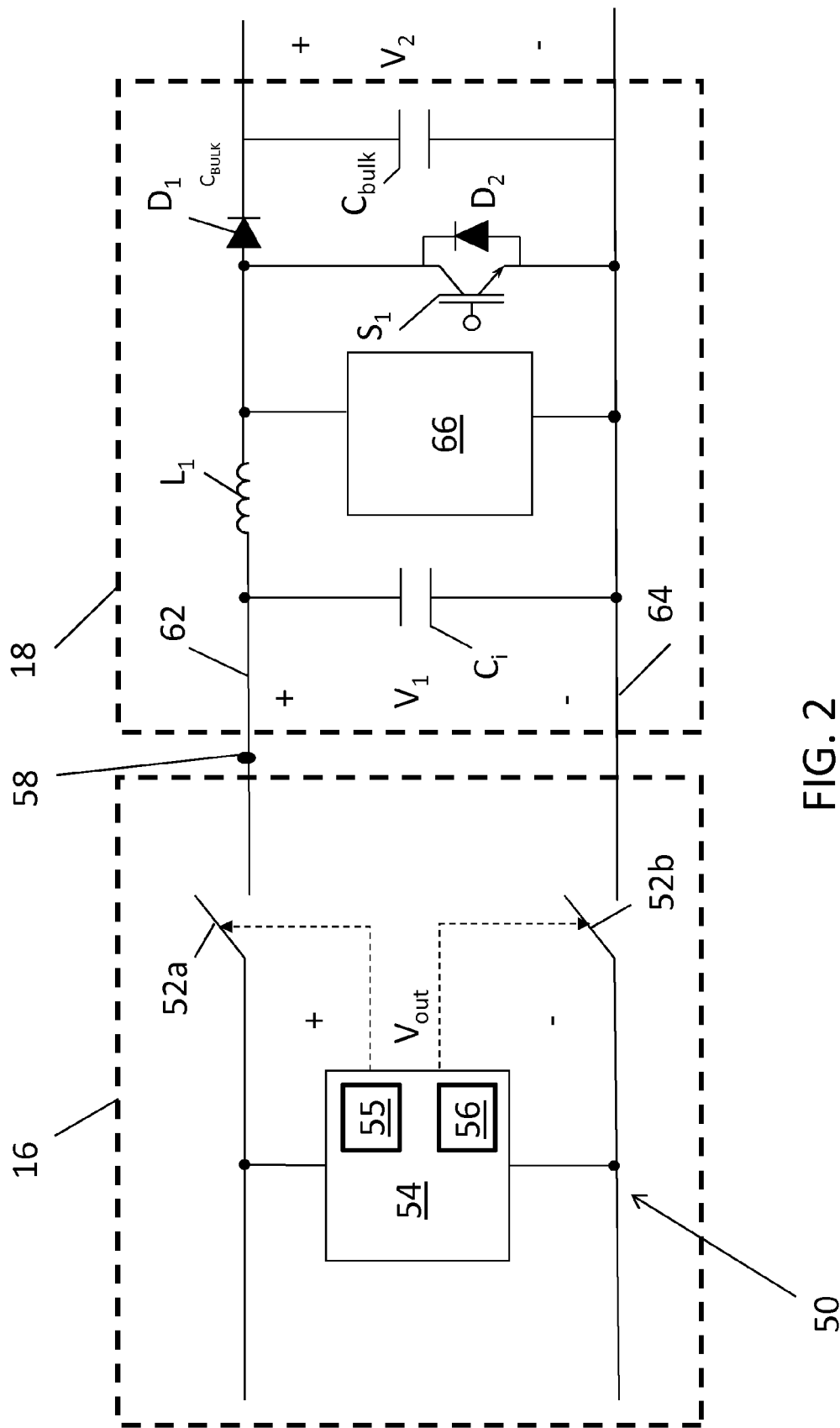
FIG. 2 is a circuit diagram of a fuel cell stack connector coupled to a power converter.

FIG. 2 is a circuit diagram illustrating portions of both the fuel cell 16 and the power converter 18. It shall be understood that both the fuel cell 16 and the power converter 18 can include more components than shown in FIG. 2.

The portion of the fuel cell 16 illustrated in FIG. 2 is commonly referred to as the stack interface unit and is generally denoted by reference numeral 50. As will be appreciated by one of skill in the art, the stack interface 50 is used to electrically couple or otherwise connect the fuel cell stack (not shown) to external elements. The fuel cell stack is, in one embodiment, a collection of individual fuel cells connected in series to increase output voltage.

The stack interface unit 50 includes one or more contactors 52. The contactors 52 can be any kind of switch that allows for the opening and closing of the circuit. In one embodiment, one or more of the contactors 52 are mechanical switches that both physically and electrically decouple two electrical components. In operation, the contactors 52 serve to electrically connect or disconnect the fuel cell 16 from at least the power converter 18 and, in one example, from any other portions of the vehicle 10 (FIG. 1).

The stack interface unit 50 also includes a contactor test unit 54 coupled in parallel with the output (illustrated as $V_{out}$) of the fuel cell 16. In one embodiment, the contactor test unit 54 includes logic 55 that causes the contactors 52a and 52b to be individually opened and closed in a particular pattern. A voltage applied at node 58 will cause currents to flow or voltages to arise based on the configuration of the contactors 52. The test unit 54 can also include sensors 56 to measure these currents and voltages. Based on the measured voltages and currents, the test unit 54 can determine if the contactors 52 are working properly. The particular details of how the test is performed can vary and is within the knowledge of the skilled artisan based on the teachings herein.

The power converter 18 illustrated in FIG. 2 includes the conventional components of a boost converter, namely, inductor $L_1$, switch S1 (illustrated as an IGBT and including diode $D_2$ disposed across the collector/emitter of the IGBT) and diode D1 coupled to on positive and negative input lines 62, 64. In one embodiment, the difference in voltage between positive and negative input lines 62, 64 is equal to $V_1$. It shall be understood that negative input line 64 may express a negative voltage with respect to ground in one embodiment. That is, in one embodiment, negative input line 64 is not a reference (ground) voltage.

As is known in the art, proper timing of the opening and closing of the switch $S_1$ can cause a voltage provided at input ($V_1$) of the power converter 18 to be increased to a higher voltage ($V_2$) at its output. In more detail, inductor $L_1$ is coupled between node 58 and the anode of diode $D_1$. Switch $S_1$ is connected such that its collector is coupled to the anode of diode $D_1$ and its emitter is coupled to negative input line 64. In one embodiment, the power converter 18 further includes a bulk capacitor $C_{bulk}$ coupled between the cathode of diode $D_1$ and the negative input line 64 that serves to smooth output ripples in $V_2$. While not illustrated in FIG. 2 it shall be understood that a switch controller 70 (FIG. 3) is coupled to and drives the opening and closing of the switch $S_1$.

In one embodiment, the power converter 18 also includes input capacitor $C_1$ coupled across $V_1$. In normal operation, $C_1$ serves as a filter capacitor to smooth the input voltage $V_1$ received by the power converter 18. As discussed above, current/power typically only flows from the fuel cell 16 to the power converter 18, not the reverse. According to embodiments disclosed herein, input capacitor $C_1$ is charged and is used to provide a stable voltage (and a current) back into the fuel cell 16 so that the test unit 54 can effectively perform contactor diagnostics as described above. As will become apparent from the following description, such power can be provided without additional power supply elements than those currently existing in fully electric vehicles or hybrid electric vehicles. In particular, according to one embodiment, the power converter 18 includes a contactor diagnostic supply interface 66 coupled either directly or indirectly to the collector of the switch $S_1$. In one embodiment, the contactor diagnostic supply interface 66 is formed as one or serially connected diodes and resistors. In another embodiment, the contactor diagnostic supply interface 66 can be formed as a charge pump. Advantageously, in both instances, the contactor diagnostic supply interface 66 can be coupled, through an isolating power supply 82 (FIG. 3), to the power source 24 (FIG. 1) already present in the vehicle. As such, $C_1$ can be charged and used to provide power for testing the contactors 52 without provision of an additional power source.

Figure 3:
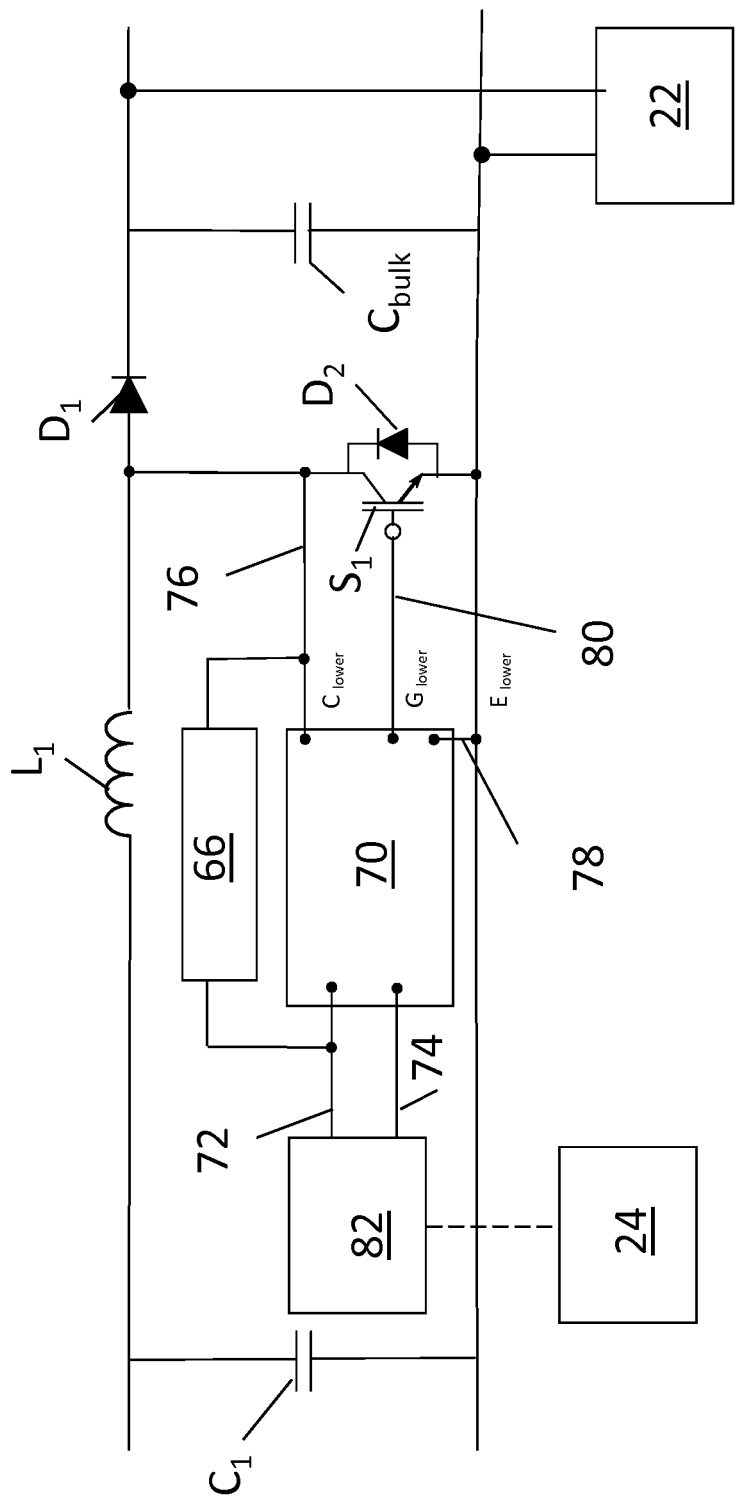
FIG. 3 is a detailed circuit diagram of a power converter.
Figure 4:
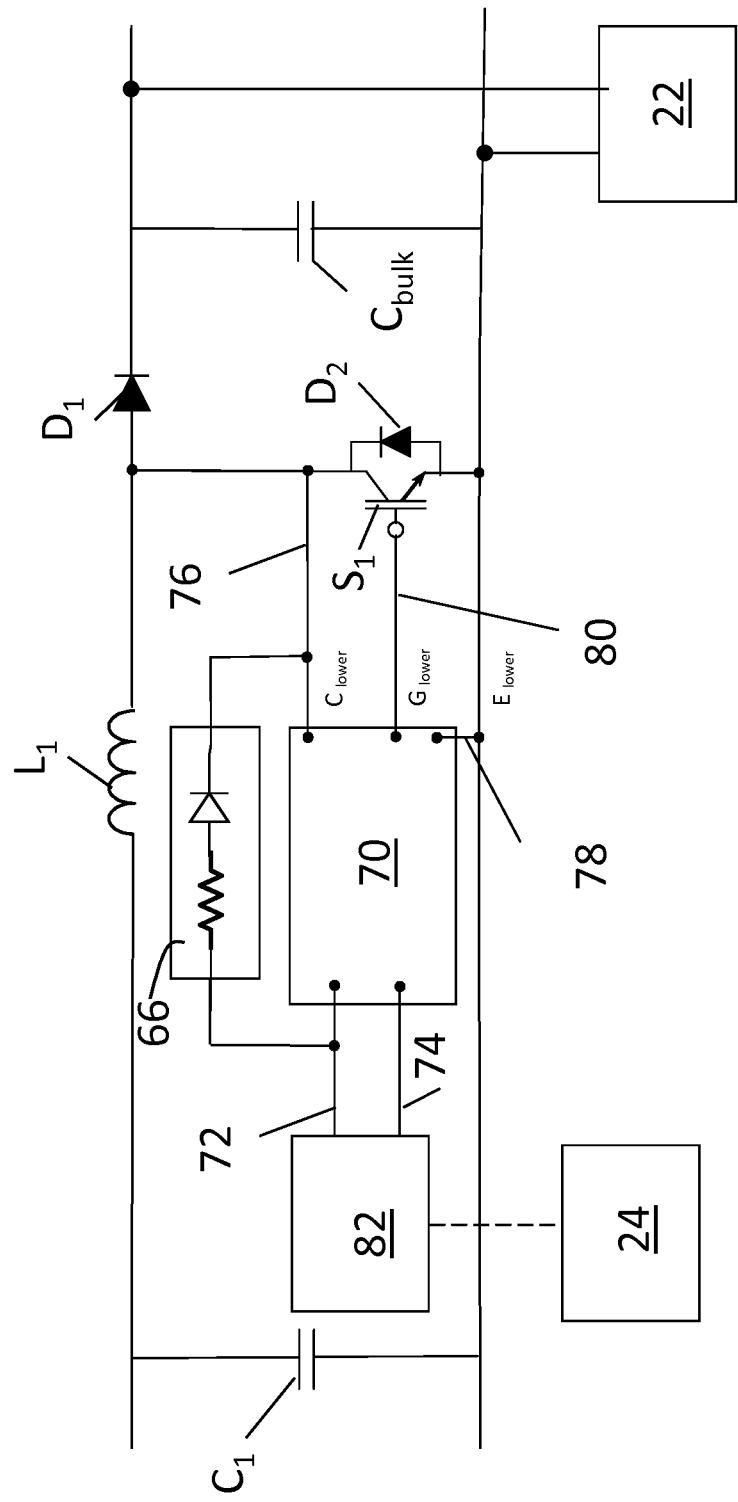
FIG. 4 is a detailed circuit diagram of a power converter according to another embodiment.

FIG. 3 is a schematic of a power converter 18 according to one embodiment. As before, the power converter 18 includes an inductor $L_1$, a diode $D_1$, and a switch $S_1$. The power converter 18 includes switch controller 70. The switch controller receives power from an isolating power supply 82. In one embodiment, the isolating power supply 82 serves to isolate power supply 24 from one or both of the fuel cell and the HV batteries. To that end, the isolating power supply 82 can include a flyback DC to DC converter. As illustrated, isolating power supply 82 provides positive and negative voltages via connections 72 and 74, respectively, to controller 70. The controller 70 uses the voltages it receives to create differential voltages on its output lines 76, 78, 80 with output line 78 serving as a reference to control the opening and closing of switch $S_1$ in a manner as is known in the art.

During normal operation, the bulk capacitor $C_{bulk}$ is charged to $V_2$ and fluctuations from this voltage are smoothed by high voltage batteries 22. The high voltage batteries 22 are blocked from providing power to the input capacitor $C_1$ by diode $D_1$. In one embodiment, at start up (e.g., before a voltage is applied to $C_1$), switch $S_1$ is opened. Current then flows from isolating power supply 82, through contactor diagnostic supply interface 66 and causes capacitor $C_1$ to charge. This charge can then be used to provide a source of power that can used to perform diagnostics on the contactors 52 (FIG. 2). This may be accomplished by coupling the contactor diagnostic supply interface 66 between the positive output 72 and the collector of the switch $S_1$ as illustrated in FIG. 3. In one embodiment, the contactor diagnostic supply interface 66 is formed of a serial connection of one or more resistors and one or more diodes. One of ordinary skill will realize that when the fuel cell (not shown) is presenting a voltage across input capacitor $C_1$, that voltage prevents current flow through the contactor diagnostic supply interface 66. Similarly, high voltage batteries 22 present a voltage across $C_{bulk}$ that keeps the current that flows through contactor diagnostic supply interface 66 to charge the input capacitor $C_1$, from flowing though diode $D_1$. In another embodiment, the contactor diagnostic supply interface 66 is formed as a charge pump. Such an embodiment may be useful if a larger voltage than can be supplied by the isolating power supply 82 is needed on the input capacitor $C_1$ to perform the contactor diagnostic.

From the above, it should be appreciated that embodiments disclosed herein can effectively provide charge on input capacitor $C_1$ that can be used to perform contactor diagnostics. This charge is provided by using elements (power supplies) already present in a vehicle and by adding only minimal circuitry.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A power converter for use in a vehicle that includes a fuel cell and an electric motor, the power converter comprising:
   input lines including a positive input line that delivers a first voltage and a negative input line that delivers a second voltage;
   an input capacitor coupled across the input lines;
   a switch coupled across the input lines and including a control contact and an additional contact, the additional contact coupled to the positive input line;
   a switch controller coupled to the control contact, the switch controller including positive and negative input connections and an output connection coupled to the positive input line and the additional contact; and
   a contactor diagnostic supply interface coupled between the positive input connection and the additional contact, wherein the additional contact, the switch controller, and the contactor diagnostic supply interface share the first voltage.

2. The power converter of claim 1, further comprising:
   an isolating power supply coupled to positive and negative input connections.

3. The power converter of claim 2, wherein the isolating power supply is a flyback direct current (DC) to DC converter.

4. The power converter of claim 1, wherein the contactor diagnostic supply interface includes:
   a diode; and
   a resistor serially connected to the diode.

5. The power converter of claim 1, wherein the contactor diagnostic supply interface is a charge pump.

6. The power converter of claim 1, wherein the switch is an insulated gate bipolar transistor (IGBT) that includes a gate, a collector and an emitter.

7. The power converter of claim 6, wherein the control contact is the gate, the contactor diagnostic supply interface is coupled to the collector, and the emitter is coupled to the negative input line.

8. The power converter of claim 7, further comprising:
   an inductor coupled between the input capacitor and the collector.

9. A vehicle comprising:
   a fuel cell;
   an electric motor; and
   a power converter electrically coupled between the fuel cell and the electric motor, the power converter including:
   input lines including a positive input line that delivers a first voltage and a negative input line that delivers a second voltage;
   an input capacitor coupled across the input lines;
   a switch coupled across the input lines and including a control contact and an additional contact, the additional contact coupled to the positive input line;
   a switch controller coupled to the control contact, the switch controller including positive and negative input connections and an output connection coupled to the positive input line and the additional contact; and
   a contactor diagnostic supply interface coupled between the positive input connection and the additional contact, wherein the additional contact, the switch controller, and the contactor diagnostic supply interface share the first voltage.

10. The vehicle of claim 9, wherein the power converter further includes:
an isolating power supply coupled to positive and negative input connections.

11. The vehicle of claim 10, wherein the isolating power supply is a flyback direct current (DC) to DC converter.

12. The vehicle of claim 10, further comprising:
a power supply coupled to the isolating power supply, wherein the isolating power supply isolates the power supply from the fuel cell.

13. The vehicle of claim 9, wherein the contactor diagnostic supply interface includes:
a diode; and
a resistor serially connected to the diode.

14. The vehicle of claim 9, wherein the contactor diagnostic supply interface is a charge pump.

15. The vehicle of claim 9, wherein the switch is an insulated gate bipolar transistor (IGBT) that includes a gate, a collector and an emitter.

16. The vehicle of claim 15, wherein the control contact is the gate, the contactor diagnostic supply interface is coupled to the collector, and the emitter is coupled to the negative input line.

17. The power converter of claim 16, further comprising:
an inductor coupled between the input capacitor and the collector.

18. A method of performing a diagnostic test on a fuel cell in a vehicle that includes a power converter electrically coupled between the fuel cell and an electric motor, the method comprising:

selectively applying a first voltage to a positive input line via a first contactor switch and selectively applying a second voltage to a negative input via a second contactor switch;

coupling a switch across the positive and negative input lines, the switch including a control contact and an additional contact, the additional contact coupled to the positive input line;

selectively outputting a control signal to the control contact via a switch controller, the switch controller including positive and negative input connections and an output connection coupled to the positive input line and the additional contact;

coupling a contactor diagnostic supply interface between the positive input connection and the additional contact, so as to share the first voltage with the additional contact, the switch controller, and the contactor diagnostic supply interface;

connecting an isolating power supply between a power source installed on the vehicle and the fuel cell, and outputting current from the isolating power supply in response to power supplied by the power source;

charging an input capacitor of the power converter with the current output from the isolated power supply in response to opening the switch; and utilizing the charge in the input capacitor to perform the diagnostic test, wherein the diagnostic test is a fuel cell contactor test that diagnoses operation of at least one of the first and second contact switches.

* * * * *